United States Patent
Rutyna et al.

(10) Patent No.: US 10,611,250 B2
(45) Date of Patent: Apr. 7, 2020

(54) SYSTEM AND METHOD FOR VEHICLE WIRELESS VEHICLE CHARGING COMMUNICATIONS USING LOCATION BASED SERVICES

(71) Applicant: Ford Global Technologies, LLC, Dearborn, MI (US)

(72) Inventors: Arthur M. Rutyna, Plymouth, MI (US); John Paul Gibeau, Canton, MI (US); Christopher W. Bell, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 233 days.

(21) Appl. No.: 15/065,147

(22) Filed: Mar. 9, 2016

(65) Prior Publication Data

US 2017/0259673 A1 Sep. 14, 2017

(51) Int. Cl.
*H02J 7/00* (2006.01)
*B60L 11/18* (2006.01)
(Continued)

(52) U.S. Cl.
CPC ............ *B60L 11/182* (2013.01); *B60L 53/12* (2019.02); *B60L 53/305* (2019.02); *B60L 53/65* (2019.02);
(Continued)

(58) Field of Classification Search
CPC .................................................... B60L 11/182
(Continued)

(56) References Cited

U.S. PATENT DOCUMENTS 6,323,775 B1 * 11/2001 Hansson ............... H02J 7/0047
235/384
9,371,007 B1 * 6/2016 Penilla ................. B60L 11/1848
(Continued)

FOREIGN PATENT DOCUMENTS

WO  2014104429 A1  7/2014

OTHER PUBLICATIONS

John M. Miller; Wireless Power Transfer (Slideshow); U.S. Dept. of Energy; Oak Ridge Laboratory; Jul. 22, 2013; 22 pages.
(Continued)

*Primary Examiner* — Suchin Parihar
(74) *Attorney, Agent, or Firm* — Brooks Kushman PC; David Kelley

(57) ABSTRACT

A system and method for managing communications with a vehicle wireless charging station include a vehicle having a battery configured for wireless charging and a vehicle computing system having a transceiver and a processor programmed to broadcast a signal by the vehicle computing system using the transceiver to establish a communication link with a vehicle wireless charging station in response to a current vehicle location being within a specified range of a previously authorized vehicle wireless charging station. The system and method may include a vehicle HMI to prompt a user for input to authorize communication with a wireless charging station that is not recognized or that has not been previously authorized. Wireless charging related broadcasts may be inhibited when the vehicle is not within a specified range of a known wireless charging station location to conserve energy and reduce potential for unauthorized responses to the vehicle broadcasts.

16 Claims, 2 Drawing Sheets

(51) Int. Cl.
  *H04W 4/44*    (2018.01)
  *H04W 12/00*   (2009.01)
  *B60L 53/12*   (2019.01)
  *B60L 53/65*   (2019.01)
  *B60L 53/30*   (2019.01)
  *H02J 50/80*   (2016.01)
  *H04W 12/08*   (2009.01)
  *H04W 4/02*    (2018.01)
  *H04W 8/00*    (2009.01)
  *H04W 4/80*    (2018.01)

(52) U.S. Cl.
  CPC ............ *H02J 50/80* (2016.02); *H04W 4/023* (2013.01); *H04W 4/44* (2018.02); *H04W 8/005* (2013.01); *H04W 12/003* (2019.01); *H04W 12/00503* (2019.01); *H04W 12/08* (2013.01); *B60L 2240/622* (2013.01); *B60L 2250/16* (2013.01); *H04W 4/80* (2018.02); *Y02D 70/142* (2018.01); *Y02D 70/144* (2018.01); *Y02D 70/164* (2018.01)

(58) Field of Classification Search
  USPC .......................................................... 320/109
  See application file for complete search history.

(56) References Cited

U.S. PATENT DOCUMENTS

| | | | |
|---|---|---|---|
| 2002/0017979 A1* | 2/2002 | Krause ................. | G01S 13/765 340/10.1 |
| 2011/0191186 A1 | 8/2011 | Levy et al. | |
| 2013/0020993 A1* | 1/2013 | Taddeo ................. | H02J 7/0027 320/109 |
| 2013/0024059 A1 | 1/2013 | Miller et al. | |
| 2013/0038424 A1* | 2/2013 | Katar .................... | H04L 67/125 340/5.8 |
| 2013/0110296 A1* | 5/2013 | Khoo ................... | B60L 11/1825 700/286 |
| 2014/0021908 A1 | 1/2014 | McCool et al. | |
| 2015/0015419 A1* | 1/2015 | Halker ................ | B60L 11/1827 340/901 |
| 2015/0130630 A1* | 5/2015 | Outwater ............... | G01D 4/006 340/870.02 |
| 2015/0202974 A1* | 7/2015 | Rub ........................ | B60L 3/12 320/109 |
| 2015/0224888 A1* | 8/2015 | Wild .................... | B60L 11/1824 705/26.9 |
| 2015/0226566 A1* | 8/2015 | North ................. | G01C 21/3469 701/428 |
| 2015/0239357 A1* | 8/2015 | Huntzicker ......... | B60L 11/1809 701/22 |
| 2016/0275400 A1* | 9/2016 | Hodges ..................... | G06N 5/04 |
| 2016/0334234 A1* | 11/2016 | Wild ....................... | G06Q 10/02 |

OTHER PUBLICATIONS

John M. Miller; Wireless Plug-In Electric Vehicle (PEV) Charging (Slideshow); U.S. Dept. of Energy; Oak Ridge Laboratory; May 15, 2012; 21 pages.

* cited by examiner

SYSTEM AND METHOD FOR VEHICLE WIRELESS VEHICLE CHARGING COMMUNICATIONS USING LOCATION BASED SERVICES

TECHNICAL FIELD

Aspects of the disclosure relate to wireless power transfer communications management using vehicle embedded location based services.

BACKGROUND

To facilitate hands-free wireless vehicle charging, a vehicle equipped with wireless charging capability communicates with a wireless charging station. Communication is initiated and managed by the vehicle and/or the charging station. Some prior art strategies have the vehicle continuously broadcasting or pinging a communications signal to establish communication with a charging station when the vehicle is within range of the charging station. However, continuous broadcasting or pinging of requests for connections or pairing unnecessarily consumes energy and may expose the vehicle to unauthorized attempts to establish communication with the vehicle (hacking). While vehicle systems that rely on the user to initiate communication with a wireless charging station via a button press or similar operation may be secure, manual initiation of communication is less convenient and does not satisfy the hands-free design intent for wireless vehicle charging.

SUMMARY

In various embodiments, a method performed by a vehicle computing system of a vehicle having a battery configured for wireless charging includes broadcasting a signal by the vehicle computing system to establish a communication link with a vehicle wireless charging station in response to a current vehicle location being within a specified range of a previously authorized vehicle wireless charging station. The method may include receiving a GPS signal by the vehicle computing system to identify the current vehicle location and enabling vehicle WiFi communications by the vehicle computing system in response to the current vehicle location being within the specified range of the previously authorized vehicle wireless charging station. In one or more embodiments, a method may also include displaying a message via a vehicle HMI in response to the current vehicle location being within a specified range of a vehicle wireless charging station that has not yet been authorized or is not recognized. Broadcasting may be performed only in response to the current vehicle location being within the specified range.

In at least one embodiment, a method for communicating with a vehicle wireless charging station may include receiving, by a vehicle computing system, a request to establish communication with a vehicle wireless charging station and communicating with the vehicle wireless charging station only if the current vehicle location is within a specified range of a previously authorized vehicle wireless charging station. Authorized or stored vehicle wireless charging station locations may be received by the vehicle computing system over a wireless communication link or a vehicle HMI. The vehicle HMI may receive a signal from a connected mobile device, such as a smart phone, identifying a vehicle wireless charging station location. In various embodiments, a method may include receiving, by a vehicle computing system, a request to establish communication with a vehicle wireless charging station, displaying a message via a vehicle HMI requesting authorization to communicate with the vehicle wireless charging station if the vehicle wireless charging station is not recognized by the vehicle computing system, and communicating, by the vehicle computing system, with the vehicle wireless charging system in response to authorization received via the vehicle HMI, or if the vehicle wireless charging station is recognized.

Embodiments may also include a system for vehicle wireless charging including a vehicle computing system having a transceiver and a processor programmed to transmit a wireless signal from the transceiver to establish communication with a wireless charging station in response to a current vehicle location being associated with a location of the wireless charging station. The processor may be further programmed to transmit the wireless signal only if the current vehicle location is associated with the location of a previously authorized wireless charging station. The system may include a vehicle HMI with a processor programmed to display a message on the vehicle HMI in response to receiving a signal from an unrecognized wireless charging station, or to send a message to the vehicle HMI in response to the current vehicle location being within a specified range of a wireless charging station that has not been authorized. The processor may be programmed to store a location of a wireless charging station in response to user input received from a vehicle HMI. In at least one embodiment, a vehicle processor is programmed to transmit a wireless signal in response to receiving a wireless signal from a wireless charging station if the wireless charging station was previously authorized by the vehicle computing system.

One or more embodiments may include a computer readable storage medium having stored instructions executable by a processor of a vehicle computing system to transmit a signal to establish communication with a wireless charging station only in response to a vehicle location being within a range of a location associated with the wireless charging station. The computer readable storage medium may also include instructions to transmit the signal in response to receiving a signal from the wireless charging station if the location of the wireless charging station is recognized by the vehicle computing system. In various embodiments, the computer readable storage medium includes instructions to display a message on a vehicle display in response to receiving a wireless signal from a wireless charging station that has not been previously stored by the vehicle computing system.

Embodiments according to the present disclosure may provide one or more advantages. For example, various embodiments generate a broadcast or ping signal to establish communication with a vehicle wireless charging station in response to a current vehicle location being within a previously determined wireless charging station location to reduce the potential for unauthorized users to intercept or respond to the vehicle broadcast. Transmitting signals only when the vehicle is near wireless charging stations also reduces the energy used to broadcast the signal relative to a continuous or periodic broadcast without regard to vehicle location relative to a wireless charging station. The vehicle user may create and store recognized wireless power transfer or charging locations so that the vehicle initiates a broadcast, pairing request, or similar communication to establish communication with the charging station based on the current vehicle location being within a predetermined or specified range of the charging station. Alternatively, the vehicle may accept pairing requests or communications only from previously authorized wireless power transfer stations based on the current vehicle location relative to an authorized charging station. The systems and methods of various embodiments may facilitate hands-free wireless charging and reduce the time required to authorize communications related to wireless vehicle charging.

The above advantages and other advantages and features associated with various embodiments will be readily apparent to those of ordinary skill in the art from the following detailed description when taken in connection with the accompanying drawings.

DETAILED DESCRIPTION

As required, detailed embodiments are disclosed herein; however, it is to be understood that the disclosed embodiments are merely representative and the claimed subject matter may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Various embodiments include a system or method for initiating or establishing communication between a vehicle wireless charging system and a stationary charging station using location based services (LBS). Vehicles equipped with a wireless power transfer (WPT) system will usually be charged at the residence of the owner or at often revisited public stations, such as a work location or frequent shopping location, for example. Using LBS to trigger communication with a WPT charging station saves vehicle energy otherwise used to continuously or periodically transmit a pairing signal or beacon. In addition, transmitting a signal only when the vehicle is near a known WPT charging station reduces the possibility for unauthorized interception or attempted hacking of the vehicle signal. One or more embodiments provide the capability for a vehicle user to add WPT charging station locations using a vehicle human-machine interface (HMI) or a linked mobile device, for example.

Figure 1:
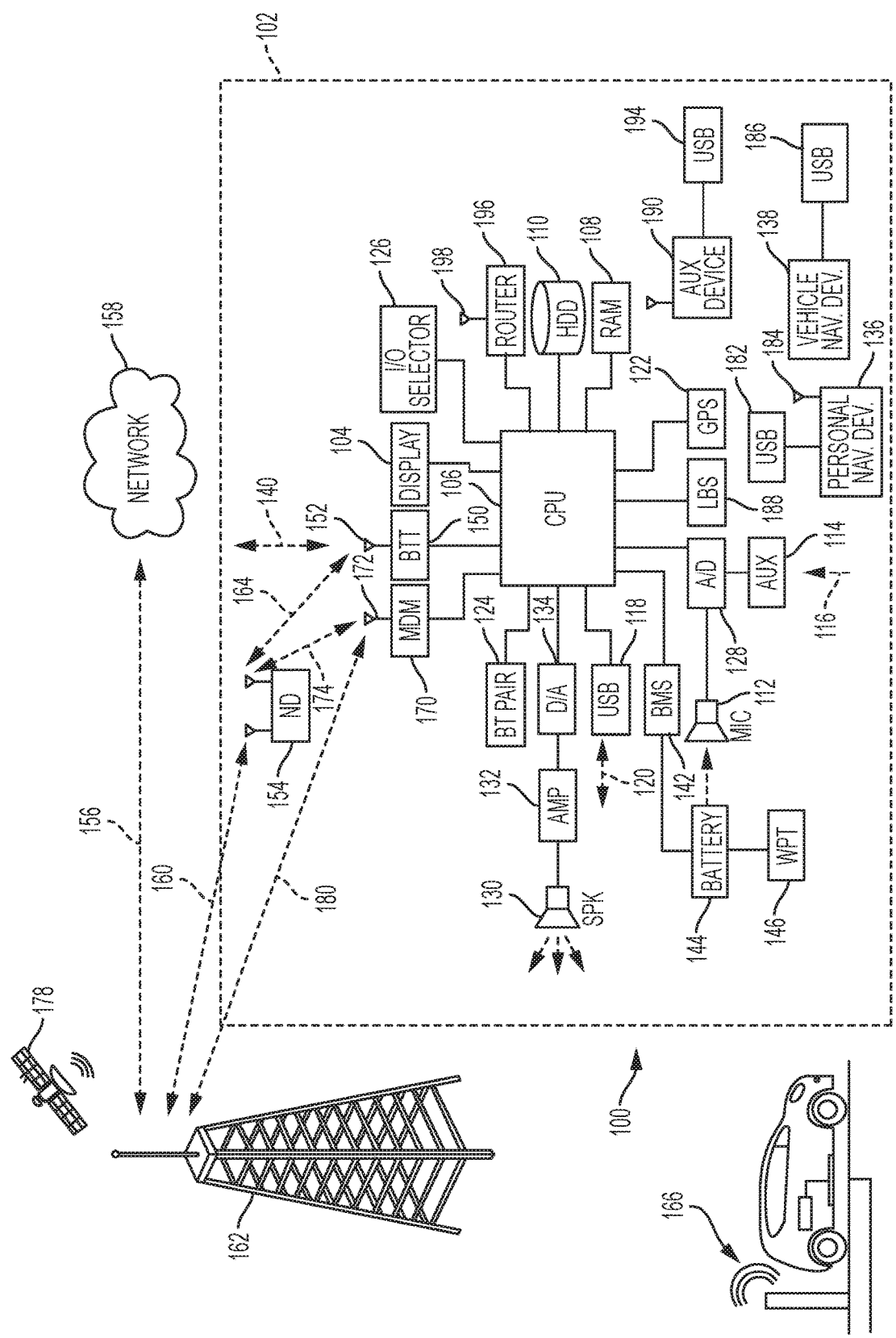
FIG. 1 is a block diagram illustrating a system or method for wireless power transfer communications management according to various embodiments.

FIG. 1 illustrates an example block topology for a vehicle based computing system 100 (VCS) for a vehicle 102. An example of such a vehicle-based computing system 100 is the SYNC system manufactured by THE FORD MOTOR COMPANY. A vehicle enabled with a vehicle-based computing system may contain an HMI or visual front end interface 104 located in the vehicle. The user may be able to interact with interface 104, for example, using a touch sensitive screen. In another illustrative embodiment, the interaction occurs through button presses or spoken dialog processed by automatic speech recognition and speech synthesis systems.

In the illustrative embodiment shown in FIG. 1, a CPU or processor 106 controls at least some portion of the operation of the vehicle-based computing system. Processor 106 generally represents one or more vehicle controllers or control modules that may communicate with one another over a vehicle network, such as a controller area network (CAN). Various functions illustrated or described with respect to processor 106 may be performed by one or more other processors not specifically illustrated. Processor 106 is connected to various types of non-transitory computer program products implementing both temporary or non-persistent storage 108 and persistent storage 110. In this illustrative embodiment, the non-persistent or temporary storage is implemented by random access memory (RAM) and the persistent storage is implemented by a non-transitory computer program product or medium such as a hard disk drive (HDD), flash drive, or flash memory. In general, persistent memory or storage can include all forms of memory or storage that maintain data when a computer or other device is powered down. This includes, but is not limited to, HDDs, CDs, DVDs, magnetic tapes, solid state drives, portable USB drives and any other suitable form of persistent memory or storage.

Processor 106 is also provided with a number of different inputs and outputs to facilitate user interaction with the processor and related devices, and to send and receive wired and wireless signals internally to vehicle components, controllers, and systems, as well as externally to other vehicles, infrastructure, or coupled devices. In this illustrative embodiment, a microphone 112, an auxiliary input 114 (for input 116), a USB interface 118 (for input/output 120), a GPS input 122, display screen 104, which may be a touch-screen display, and a BLUETOOTH pairing interface 124 are all provided. An input/output (I/O) selector 126 may be provided to facilitate user selection of a particular input/output for use. Input to both microphone 112 and auxiliary interface 114 may be converted from analog to digital signals by an associated A/D converter 128 before being communicated to processor 106. Although not explicitly illustrated, vehicle components and auxiliary components in communication with the VCS may use a wired or wireless vehicle network (including, but not limited to, a CAN bus) to communicate signals representing data to and from the VCS (or components thereof) as previously described.

System outputs may include, but are not limited to, a visual display 104 and speakers 130 or other stereo system output. Speakers 130 are connected to an amplifier 132 and receive signals from processor 106 through a digital-to-analog converter 134. Input and output signals may also be communicated via a remote BLUETOOTH device such as a personal navigation device (PND) 136, or a USB device, such as vehicle navigation device 138, along the bi-directional data streams generally represented at 120 and 140.

In one illustrative embodiment, system 100 uses a BLUETOOTH transceiver 150 to wirelessly communicate 152 with a mobile or nomadic device 154 (e.g., cell phone, smart phone, PDA, or any other device having wireless remote network connectivity). Nomadic device 154 can then be used to communicate 156 with a network 158 outside vehicle 102 through, for example, communication 160 with a satellite 178 or cellular tower 162. In some embodiments, cellular tower 162 or a similar tower or antenna may function as a WiFi access point. Vehicle 102 may also use BLUETOOTH transceiver 150 to communicate with a stationary WPT vehicle charging station 166 as described in greater detail herein.

Nomadic device 154 may also be paired to vehicle 102 and communicate via BLUETOOTH or similar technology as represented by signal 164. Pairing of nomadic device 154 and BLUETOOTH transceiver 150 may be initiated by an associated button or interface 124, or similar input. Accordingly, processor 106 pairs an onboard BLUETOOTH transceiver 152 with a BLUETOOTH transceiver in nomadic device 154 or stationary WPT vehicle charging station 166.

Data may be communicated between processor 106 and network 158 utilizing, for example, a data-plan, data over voice, or DTMF tones associated with nomadic device 154. Alternatively, it may be desirable to include an onboard modem 170 having antenna 172 for communication 174 of data between CPU 106 and network 158 over the voice band. Nomadic device 154 may then be used for communication 156 with network 158 outside vehicle 102 through, for example, communication 160 with cellular tower 162 or satellite 178. In some embodiments, modem 172 may establish communication 180 with tower 162 to communicate with network 158. As one example, modem 172 may be a USB cellular modem and communication 180 may be cellular communication.

In one illustrative embodiment, processor 106 is provided with an operating system including an API to communicate with modem application software. The modem application software may access an embedded module or firmware of BLUETOOTH transceiver 152 to complete wireless communication with a remote BLUETOOTH transceiver, such as that found in nomadic device 154, for example. BLUETOOTH is a subset of IEEE 802 PAN (personal area network) protocols. IEEE 802 LAN (local area network) protocols include WiFi and have considerable cross-functionality with IEEE 802 PAN protocols. Both are suitable for wireless communication within a vehicle. Other communication technology may also be suitable for wired or wireless communications within the vehicle, such as free-space optical communication (IrDA, for example), non-standardized consumer infrared (IR) protocols, and the like. In another embodiment, nomadic device 154 includes a modem for voice band or broadband data communication.

In one embodiment, incoming data can be passed through nomadic device 154 through onboard BLUETOOTH transceiver 150 to processor 106. In the case of certain temporary data, for example, the data can be stored on HDD 110 or other storage media until such time as the data is no longer needed.

As previously described, various devices may interface with VCS 100, such as personal navigation device 136, having a USB connection 182 and/or an antenna 184, vehicle navigation device 138 having a USB connection 186 or other connection, onboard GPS device 122, or remote navigation system (not shown) having connectivity to network 158. As used herein, USB generally represents any of a variety of serial networking protocols that may include IEEE 1394 protocols referred to as FireWire™ (Apple), i.LINK™ (Sony), and Lynx™ (Texas Instruments), EIA (Electronics Industry Association) serial protocols, IEEE 1284 (Centronics Port), S/PDIF (Sony/Philips Digital Interconnect Format) and USB-IF (USB Implementers Forum), which form the backbone of the device-device serial standards. Most of the protocols can be implemented for either electrical or optical communication.

As also shown in FIG. 1, processor 106 may communicate with various other types of auxiliary devices 190. These devices may be connected through a wireless connection/antenna 192 and/or a wired connection 194. Auxiliary devices 190 may include, but are not limited to, personal media players, wireless health devices, portable computers, and the like. Processor 106 may also be connected to a vehicle based wireless router 196, using for example a WiFi (IEEE 803.11) transceiver 198. This could allow processor 106 to connect to remote networks in range of vehicle based wireless router 196. Processor 106 may also communicate with a vehicle battery management system (BMS) 142 that controls charging, discharging, and other functions of battery 144 and WPT system 146.

In one embodiment, vehicle computing system 100 utilizes processor 106 and associated temporary and persistent memory RAM 108 and HDD 110, respectively to store locations associated with WPT charging stations 166 and to broadcast a signal by VCS 100 using router 196, nomadic device 154, modem 170, BLUETOOTH transceiver 172, or a similar device to establish a communication link with WPT charging station 166 in response to a current vehicle location being within a specified range of a previously stored or authorized WPT charging station. Location based services (LBS) 188 may use various signals from one or more connected devices, such as nomadic device 154, GPS system 122, personal navigation device 136, vehicle navigation device 138, and the like to determine current vehicle location relative to a location associated with a known or authorized WPT charging station 166.

Display 104 may be used in combination with one or more inputs and outputs, such as microphone 112, speaker 130, and/or nomadic device 154 functioning as a vehicle human-machine interface (HMI). Vehicle processor 106 is coupled to the HMI and programmed to store, in persistent memory 110, one or more locations of WPT charging stations 166 that may be entered or identified using the HMI. Alternatively, or in combination, processor 106 may wirelessly receive location information for known, preferred, or otherwise recognized or authorized WPT charging stations 166 via cellular 162, satellite 178, or via nomadic device 154, for example.

Figure 2:
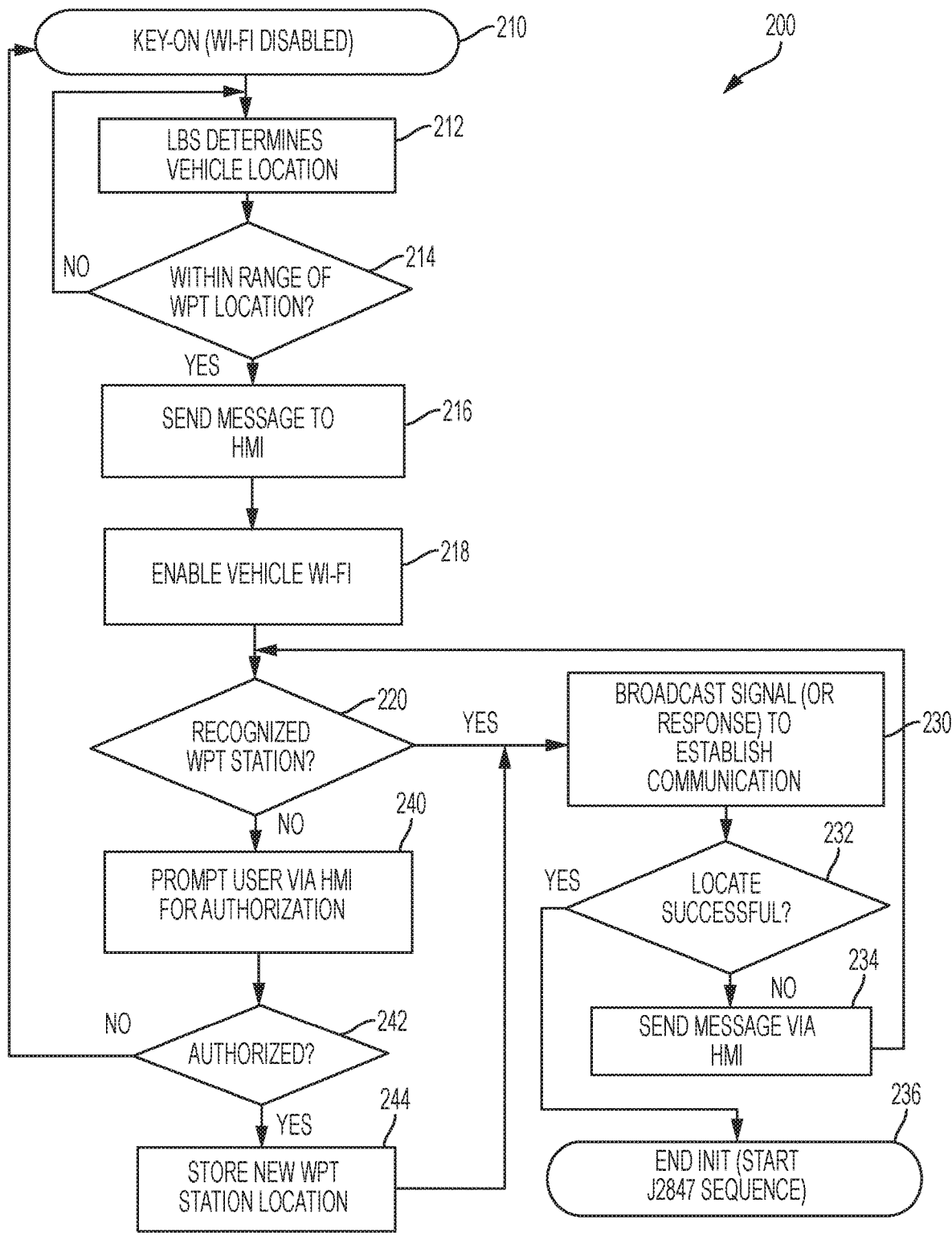
FIG. 2 is a flowchart illustrating operation of a system or method for wireless power transfer communications management according to various embodiments.

FIG. 2 is a flowchart illustrating operation of a system or method for wireless power transfer communications management according to various embodiments. System or method 200 illustrated in the representative embodiment may be executed by a vehicle computing system 100 (FIG. 1) located in a vehicle 102 (FIG. 1). In some embodiments, processes may be executed by a computing system in communication with a vehicle computing system. Such a system may include, but is not limited to, a wireless device (e.g., and without limitation, a mobile phone or portable computer) or a remote computing system (e.g., and without limitation, a server or computer) connected through the wireless device. Collectively, such systems may be referred to as vehicle associated computing systems (VACS). In certain embodiments particular components of the VACS may perform particular portions of a process depending on the particular implementation of the system. As generally understood by those of ordinary skill in the art, system or method 200 may be implemented through a computer algorithm, machine executable code, or software instructions programmed into one or more suitable processors, controllers, computers or other programmable logic devices associated with the vehicle, such as processor 106, nomadic device 154, remote network 158, another controller in communication with the vehicle computing system, or a combination thereof. Although the various operations shown in the simplified flowchart appear to occur in a particular order or sequence, one or more of the operations or features may be performed in a different order, may be repeatedly performed, may be performed concurrently or may be omitted.

System or method 200 begins at block 210 where vehicle Wi-Fi may be disabled or otherwise inhibited from transmitting or broadcasting WPT related signals or messages upon vehicle key-on. The location-based services (LBS) using one or more vehicle devices or linked devices to determine a current vehicle location as represented at 212. As previously described, LBS may use GPS signals, cellular signals, or information from a linked mobile device, for example, to determine the current vehicle location. The VCS determines if the vehicle is within a specified range of a WPT charging station location as represented at 214. The WPT charging station locations may be stored in a table or database that may be updated based on the current vehicle location by wirelessly receiving information for a corresponding data service. Alternatively, or in combination, the VCS may include previously stored WPT charging station locations entered by a user or loaded to the VCS from a local or wide area network connection, for example. The specified range may be user specified or determined by a VCS default range depending on the particular application.

If the current vehicle location or position is not within range of a WPT charging location as determined at 214, the Wi-Fi signals may continue to be disabled or inhibited. In one or more embodiments, block 214 may determine whether the current vehicle location is within a specified range of a previously authorized vehicle WPT (wireless) charging station based on a GPS signal received by the VCS to identify the current vehicle location using the vehicle LBS.

Block 216 sends a message to a vehicle HMI, which may include a connected mobile device HMI, in response to determining that the vehicle is within a specified range of a WPT charging station location as determined at block 214. Vehicle Wi-Fi communications may then be enabled in response to the current vehicle location being within the specified range of the previously authorized vehicle wireless charging station as represented at 218.

In the representative embodiment illustrated, block 220 determines whether the WPT charging station location is a recognized or previously authorized WPT station. If recognized, authorized, or otherwise known by the VCS as a valid WPT charging station, block 230 broadcasts a signal by the VCS to establish a communication link with the WPT charging station. In one embodiment, block 230 may represent receiving a signal from the WPT charging station and responding to the signal if the WPT charging station has been previously stored, authorized, or is otherwise recognized.

If the communication link is not successful as represented at 232, a corresponding message may be sent to the vehicle HMI as represented at 234. Otherwise, if the communication is successful as represented at 232, the initialization or authentication phase is completed and a WPT sequence may be started as represented at 236.

If the WPT charging station is not recognized or otherwise not authorized as represented at 220, a corresponding message or prompt is sent to the HMI for authorization of the WPT charging station location as represented at 240. In respect to user input received from the HMI indicating that the WPT charging station location is authorized or should otherwise be added as a recognized WPT charging station location as represented at 242, the WPT charging station location is stored by the VCS as represented at 244. Otherwise, control may return to disable the vehicle Wi-Fi as generally represented at 210.

As such, embodiments according to the present disclosure may provide one or more advantages such as incorporating LBS to enable communication with a WPT charging station to reduce the possibility of unauthorized interception of the vehicle signals, or from the vehicle responding to an unauthorized signal. Authorized or known WPT charging station locations can be used to speed charging authorization when the vehicle arrives for charging.

While representative embodiments are described above, it is not intended that these embodiments describe all possible forms of the claimed subject matter. Rather, the words used in the specification are words of description rather than limitation, and it is understood that various changes may be made without departing from the spirit and scope of the disclosure. Additionally, the features of various implementing embodiments may be combined to form further embodiments that are not explicitly described or illustrated. While various embodiments may have been described as providing advantages or being preferred over other embodiments or prior art implementations with respect to one or more desired characteristics, as one of ordinary skill in the art is aware, one or more features or characteristics may be compromised to achieve desired overall system attributes, which depend on the specific application and implementation. These attributes include, but are not limited to: cost, strength, durability, life cycle cost, marketability, appearance, packaging, size, serviceability, weight, manufacturability, ease of assembly, etc. Embodiments described as less desirable than other embodiments or prior art implementations with respect to one or more characteristics are not necessarily outside the scope of the disclosure and may be desirable for particular applications.

What is claimed is:

1. A method for wireless charging of a vehicle at one of a plurality of previously authorized wireless charging station locations authorized prior to the vehicle being within a specified range of the wireless charging station locations, the method comprising, by a vehicle computing system:
    retrieving the locations of the previously authorized wireless charging stations; and
    broadcasting an initial signal by the vehicle computing system to establish a communication link with one of the previously authorized wireless charging station locations in response to a current vehicle location being within the specified range of one of the previously authorized vehicle wireless charging station locations, and not broadcasting the initial signal in response to the current vehicle location being outside the specified range.

2. The method of claim 1 further comprising receiving a GPS signal by the vehicle computing system to identify the current vehicle location.

3. The method of claim 1 further comprising enabling WiFi communications by the vehicle computing system in response to the current vehicle location being within the specified range of one of the previously authorized vehicle wireless charging station locations.

4. The method of claim 1 further comprising displaying a message via a vehicle HMI in response to the current vehicle location being within a specified range of a vehicle wireless charging station that has not yet been authorized.

5. The method of claim 1 wherein the broadcasting of the initial signal is performed only in response to the current vehicle location being within the specified range.

6. The method of claim 1 further comprising:
    receiving, by the vehicle computing system, a request to establish communication with a vehicle wireless charging station; and
    communicating with the vehicle wireless charging station only if the current vehicle location is within the specified range of one of the previously authorized vehicle wireless charging station locations.

7. The method of claim 1 further comprising receiving authorized vehicle wireless charging station locations by the vehicle computing system over a wireless communication link.

8. The method of claim 1 further comprising receiving authorized vehicle wireless charging station locations by the vehicle computing system from a vehicle HMI.

9. The method of claim 8 wherein the vehicle HMI receives a signal from a mobile device identifying a vehicle wireless charging station location.

10. The method of claim 1 further comprising:
receiving, by the vehicle computing system, a request to establish communication with a vehicle wireless charging station;
displaying a message via a vehicle HMI requesting authorization to communicate with the vehicle wireless charging station if the vehicle wireless charging station is not one of the previously authorized wireless charging station locations; and
communicating, by the vehicle computing system, with the vehicle wireless charging system in response to authorization received via the vehicle HMI, or if the vehicle wireless charging station is one of the previously authorized wireless charging station locations.

11. A system for vehicle wireless charging, comprising:
a vehicle computing system having a transceiver and a processor programmed to transmit an initial wireless signal from the transceiver to establish communication with a wireless charging station in response to a comparison of a current vehicle location to a location of the wireless charging station indicating the vehicle is within a specified range of the wireless charging station, and to not transmit the initial wireless signal in response to the current vehicle location not being associated with the location.

12. The system of claim 11, the processor further programmed to transmit the initial wireless signal only if the current vehicle location is associated with the location of a previously authorized wireless charging station.

13. The system of claim 11 further comprising a vehicle HMI, the processor further programmed to display a message on the vehicle HMI in response to receiving a signal from an unrecognized wireless charging station.

14. The system of claim 11, the processor further programmed to send a message to a vehicle HMI in response to the current vehicle location being within a specified range of a wireless charging station that has not been authorized.

15. The system of claim 11, the processor further programmed to store a location of a wireless charging station in response to user input received from a vehicle HMI.

16. The system of claim 11, the processor further programmed to transmit the wireless signal in response to receiving a wireless signal from the wireless charging station if the wireless charging station was previously authorized by the vehicle computing system.

\* \* \* \* \*